(12) United States Patent
Sato et al.

(10) Patent No.: US 8,883,072 B2
(45) Date of Patent: Nov. 11, 2014

(54) NI-BASE ALLOY, HIGH-TEMPERATURE MEMBER FOR STEAM TURBINE AND WELDED ROTOR FOR TURBINE USING THE SAME, AND METHOD FOR MANUFACTURING THE SAME

(75) Inventors: Jun Sato, Hitachi (JP); Shinya Imano, Hitachi (JP); Hiroyuki Doi, Tokai (JP)

(73) Assignee: Hitachi, Ltd., Tokyo (JP)

( * ) Notice: Subject to any disclaimer, the term of this patent is extended or adjusted under 35 U.S.C. 154(b) by 652 days.

(21) Appl. No.: 12/551,884

(22) Filed: Sep. 1, 2009

(65) Prior Publication Data

US 2010/0059146 A1    Mar. 11, 2010

(30) Foreign Application Priority Data

Sep. 9, 2008  (JP) .................. 2008-230399
Sep. 30, 2008  (JP) .................. 2008-252127

(51) Int. Cl.
*C21D 1/18*    (2006.01)
*F01D 5/06*    (2006.01)
(Continued)

(52) U.S. Cl.
CPC .............. *C22C 19/055* (2013.01); *F01D 5/063* (2013.01); *Y02T 50/671* (2013.01); *B23K 35/304* (2013.01); *B23K 2201/001* (2013.01); *C22F 1/10* (2013.01); *B23K 35/004* (2013.01); *C22C 19/056* (2013.01)
USPC ............ 420/445; 420/588; 148/530; 148/336

(58) Field of Classification Search
USPC ........................... 148/336, 530; 420/445, 588
See application file for complete search history.

(56) References Cited

U.S. PATENT DOCUMENTS 4,093,476 A   6/1978 Boesch
4,456,481 A   6/1984 McGinniss
(Continued)

FOREIGN PATENT DOCUMENTS

EP   2 050 830 A2   4/2009
EP   2 050 830 A3   9/2009
(Continued)

OTHER PUBLICATIONS

Machine translation of JP2005121023.*
(Continued)

*Primary Examiner* — Rebecca Lee
(74) *Attorney, Agent, or Firm* — Antonelli, Terry, Stout & Kraus, LLP.

(57) ABSTRACT

The present invention provides, in a γ' phase precipitation strengthening type Ni-base alloy, an alloy excellent in heat treatment capability and weldability and suitable for joint with a ferritic steel. Further, the present invention provides a welded turbine rotor having the strength, ductility, and toughness simultaneously over the whole welded structure when a precipitation strengthening type Ni-base alloy having a heat-proof temperature of 675° C. or higher is joined to a ferritic steel.

A Ni-base alloy according to the present invention contains cobalt, chromium, aluminum, carbon, boron, and at least either tungsten or molybdenum with the remainder being nickel and inevitable impurities, having an alloy composition including 12 to 25 percent by mass of Co, 10 to 18 percent by mass of Cr, 2.0 to 3.6 percent by mass of Al, 0.01 to 0.15 percent by mass of C, 0.001 to 0.03 percent by mass of B, the total amount of tungsten and molybdenum being 5.0 to 10 percent by mass.

A welded turbine rotor is structured by joining or building up by welding a second Ni-base alloy to a first Ni-base alloy that a γ' phase solid solution temperature thereof is 900° C. or higher and a creep fracture strength at 675° C. is 100 MPa or more, and further welding a ferritic steel to the second Ni-base alloy. The second Ni-base alloy is a γ' phase (Ni₃Al) precipitation strengthening type Ni-base alloy, a γ' phase solid solution temperature thereof is 850° C. or lower.

13 Claims, 8 Drawing Sheets (51) Int. Cl.
  *B23K 35/30* (2006.01)
  *C22F 1/10* (2006.01)
  *B23K 35/00* (2006.01)
  C22C 19/05 (2006.01)
  C22C 38/00 (2006.01)
  C22C 30/00 (2006.01)

(56) References Cited

U.S. PATENT DOCUMENTS

| 5,047,091 A | * | 9/1991 | Khan et al. | 148/535 |
| 2004/0076540 A1 | * | 4/2004 | Imano et al. | 420/450 |

FOREIGN PATENT DOCUMENTS

| JP | 09-157779 | 6/1997 |
| JP | 2000-256770 | 9/2000 |
| JP | 2005-121023 | 5/2005 |

OTHER PUBLICATIONS

JP Office Action 2008-230399 dated Aug. 24, 2010 with partial translation.

Extended European Search Report mailed Aug. 17, 2011, for Application No. 09169007.3; 13 pages; European Patent Office; Munich, Germany.

* cited by examiner

CONVENTIONAL TYPE WELDED ROTOR (CONVENTIONAL)

FIG.11B

INTERMEDIATE RING USED (RING)

FIG.11C

INTERMEDIATE BUILD UP WELDING USED (BUILD UP)

NI-BASE ALLOY, HIGH-TEMPERATURE MEMBER FOR STEAM TURBINE AND WELDED ROTOR FOR TURBINE USING THE SAME, AND METHOD FOR MANUFACTURING THE SAME

CLAIM OF PRIORITY

The present application claims priority from Japanese Patent application serial No. 2008-230399, filed on Sep. 9, 2008, and Japanese Patent application serial No. 2008-252127, filed on Sep. 30, 2008, the contents of which are hereby incorporated by reference into this application.

BACKGROUND OF THE INVENTION

1. Field of the Invention

The present invention relates to a Ni-base alloy suitable for joint with a ferritic steel, a high-temperature member for a steam turbine and a welded rotor for a turbine using the Ni-base alloy and a method for manufacturing the same.

2. Description of Related Art

A Ni-base heat resistant alloy is used for a high-temperature member such as an industrial gas turbine, an aviation jet engine or the like. Since the Ni-base heat resistant alloy contains solid solution strengthening elements such as W, Mo and Co or precipitation strengthening elements such as Al, Ti, Nb and Ta abundantly, it shows an excellent high-temperature strength. Because a γ' $Ni_3$ (Al, Ti) phase that is a primary strengthening phase has a property of increasing its strength as the temperature rises, it is extremely effective in improving the strength property at a high temperature, and therefore the development of the alloy is carried out mainly with an aim of increasingly precipitating the γ' phase.

In the meantime, a high-Cr ferritic heat resistant steel has heretofore been used as a steam turbine member used for coal fired power generation. The ferritic heat resistant steel is generally better than a Ni-base alloy in manufacturability and can be used for manufacturing a large forged material, such as a turbine rotor having a weight exceeding 20 tons. With a Ni-base alloy in contrast, it is difficult to manufacture a large material comparable with a ferritic heat resistant steel by current technologies. From the viewpoints of $CO_2$ reduction, resource savings and others, it is required to raise a steam temperature in order to realize electric power generation of a higher efficiency. The heatproof temperature of a currently used ferritic heat resistant steel is about 600° C. and it is necessary to use a Ni-base heat resistant alloy having a higher heatproof temperature in order to further raise the steam temperature.

Since it is difficult to manufacture a large material comparable with a ferritic heat resistant steel with a Ni-base alloy as stated above however, a material of a structure wherein only a part heated to a highest temperature and exposed to severe environment is made of a Ni-base alloy and the other part is made of a conventional ferritic heat resistant steel is proposed.

Such a structure is required to join a Ni-base alloy to a ferritic heat resistant steel by such a means as welding. Problems caused by the difference in the properties between both the materials are concerned therefore and inventions aimed at solving the problems are reported. A Ni-base alloy having a low thermal expansion coefficient aimed at mitigating the thermal stress caused by the difference of thermal expansion coefficient is proposed in Document 1 (Japanese Patent Laid-open No. Hei 09-157779) and Document 2 (Japanese Patent Laid-open No. 2000-256770).

With regard to welding for forming a joining structure, in general, welding of a Ni-base alloy is more difficult than welding of a ferritic heat resistant steel. In the case of a Ni-base alloy, a γ' phase is precipitated as a strengthening phase by applying solution treatment at 1,000° C. to 1,100° C. and thereafter applying aging treatment at about 750° C. to 1,000° C. However, when welding is applied in the state of precipitating the γ' phase, cracking is likely to be caused by thermal stress. Consequently, it is desirable to carry out welding operation in the state of minimizing the precipitation of the γ' phase. When heat treatment of 700° C. or higher is applied to a ferritic heat resistant steel however, strength is extremely hindered and hence temperature of the heat treatment after welding is restricted to about 600° C. to 700° C. Consequently, although the joining structure of a high strength can be realized if a γ' phase can be precipitated abundantly by the heat treatment of about 600° C. to 700° C., with a conventional Ni-base alloy, the quantity of the precipitated γ' phase is small and a sufficient strength is not obtained in the temperature range.

Further, when a ferritic steel and a Ni-base superalloy are welded to each other, a normal method is to weld the ferritic steel in the state of being subjected to quenching and tempering and the Ni-base superalloy in the state of being subjected to solution treatment. It is necessary to apply intermediate aging treatment at a temperature of 800° C. to 850° C. for securing ductility and toughness of the superalloy after the welding. But the strength property deteriorates considerably when the ferritic steel part is heated in the temperature range. Furthermore, it is impossible to obtain excellent ductility and toughness at the Ni-base superalloy part when aging treatment and residual stress relaxation treatment are applied at a temperature of 700° C. or lower after the welding.

Document 3 (Japanese Patent Laid-open No. 2005-121023) describes a different-materials-welded rotor comprising a ferritic steel and a precipitation strengthening type Ni-base alloy and having an intermediate ring comprising a solid solution strengthening type Ni-base alloy (IN617) excellent in weldability as an intermediate layer.

An object of the present invention is to provide a Ni-base alloy that is excellent in weldability and low-temperature aging property, is suitable for joint with a ferritic steel and makes it possible to realize a highly reliable welded joining structure with the ferritic heat resistant steel, and a high-temperature member for a steam turbine using such a Ni-base alloy.

Another object of the present invention is to solve a problem of heat treatment consistency that arises when a precipitation strengthening type Ni-base superalloy having a heatproof temperature of 675° C. or higher is joined to a ferritic steel, and to simultaneously render strength, ductility and toughness to a whole welded structure.

SUMMARY OF THE INVENTION

A feature of the present invention to solve the aforementioned problems is a Ni-base alloy comprising cobalt, chromium, aluminum, carbon, boron, and at least either tungsten or molybdenum with the remainder being nickel and inevitable impurities, having an alloy composition including 12 to 25 percent by mass of Co, 10 to 18 percent by mass of Cr, 2.0 to 3.6 percent by mass of Al, 0.01 to 0.15 percent by mass of C, 0.001 to 0.03 percent by mass of B, the total amount of tungsten and molybdenum being 5.0 to 10 percent by mass.

Another feature of the present invention to solve the aforementioned problems is a welded turbine rotor configured by integrating a first Ni-base alloy and a ferritic steel through a second Ni-base alloy. The first Ni-base alloy is a precipitation strengthening type Ni-base alloy that a γ' phase (Ni₃Al) solid solution temperature thereof is 900° C. or higher and a creep fracture strength at 675° C. is 100 MPa or more. Further, the second Ni-base alloy is a γ' phase (Ni₃Al) precipitation strengthening type Ni-base alloy and is characterized by not substantially containing Ti, Ta and Nb, being able to precipitate the γ' phase by 10% to 25% by volume in the temperature range of 650° C. to 700° C., and a solid solution temperature of the γ' phase being 850° C. or lower. That is to say, a welded turbine rotor configured by integrating a nickel member comprising a first Ni-base alloy and a steel member comprising a ferritic steel through a second Ni-base alloy, wherein the first Ni-base alloy is a Ni-base alloy that a γ' phase solid solution temperature thereof is 900° C. or higher and a creep fracture strength at 675° C. is 100 MPa or more, and wherein the second Ni-base alloy is a γ' phase precipitation strengthening type Ni-base alloy, a γ' phase solid solution temperature thereof is 850° C. or lower, and a γ' phase precipitate thereof is 10% to 25% by volume. The second Ni-base alloy may be joined by welding to the first Ni-base alloy or may be built up by welding onto the first Ni-base alloy. The above configuration is preferably applied to a steam turbine that a main steam temperature thereof is 675° C. or higher.

Another feature of the present invention to solve the aforementioned problems is a method for manufacturing a welded turbine rotor configured by integrating a first Ni-base alloy and a ferritic steel through a second Ni-base alloy, the method comprising the steps of integrating the first Ni-base alloy and the second Ni-base alloy by building up or joining the second Ni-base alloy to the first Ni-base alloy, subjecting the integrated Ni-base alloys to a solution treatment at a temperature of 900° C. or higher and further to stabilizing an aging treatment in the temperature range between a solid solution temperature of the second Ni-base alloy and 900° C., thereafter welding a quenched-and-tempered ferritic steel to the second Ni-base alloy, and applying a stress relaxation treatment to a ferritic steel part and a precipitation strengthening treatment to a Ni-base alloy part by subjecting a turbine rotor formed by integrating the Ni-base alloys and the ferritic steel to an aging treatment at 650° C. to 700° C. When the solution treatment is applied before the second Ni-base alloy is built up or joined to the first Ni-base alloy, the solution treatment to be applied after the second Ni-base alloy is built up or joined to the first Ni-base alloy may be omitted.

It is further desirable that the second Ni-base alloy is a Ni-base alloy excellent in weldability and high-temperature strength. More specifically, the second Ni-base alloy is desirably a Ni-base alloy that has a γ' phase the solid solution temperature of which is 850° C. or lower and can precipitate the γ' phase by 10% to 25% by volume in the temperature range of 650° C. to 700° C. Here, the solid solution temperature of the γ' phase may be referred to a γ' phase solid solution temperature.

Further, the second Ni-base alloy is desirably a γ' phase (Ni₃Al) precipitation strengthening type Ni-base alloy that contains 0.001 to 0.1 mass % C, 10 to 20 mass % Cr, 2.0 to 3.0 mass % Al, W and Mo by 5 to 12 mass % in total, and inevitable impurities, and does not contain Ti, Ta and Nb.

The present invention makes it possible to provide a Ni-base heat resistant alloy excellent in weldability and aging property and suitable for joint with a ferritic steel. Further, the present invention makes it possible to considerably improve the high-temperature strength and ductility of a welded structure comprising a ferritic steel and a Ni-base alloy and largely improve the reliability of a welded rotor for a steam or gas turbine, in particular.

DETAILED DESCRIPTION OF THE PREFERRED EMBODIMENTS

Firstly, a Ni-base alloy according to the present invention is explained.

We have studied a Ni-base alloy through a strength evaluation, a thermodynamic computation and others, and investigated in detail the phase stability of a γ' phase that is a strengthening phase of the Ni-base alloy in particular. As a result, we have invented a Ni-base alloy that has a γ' phase the solid solution temperature (an upper limit temperature at which precipitation occurs) of which is low, is excellent in weldability, has a precipitation quantity of the γ' phase abundantly at 600° C. to 700° C., and can obtain a high strength through an aging treatment.

The effects of alloying elements and reasons for limiting a composition of an alloy are described hereunder. Regarding the composition, unit is indicated by mass percentage.

Co has an effect of improving a high-temperature strength by being replaced with Ni and dissolving in a matrix, and also contributes to a high-temperature corrosion resistance. In the range of the alloy composition stipulated in the present invention, the effects are conspicuously recognized when Co is contained by 12% or more. Excessive addition of Co however enhances the precipitation of harmful phases such as a σ phase and a μ phase and hence an upper limit of Co is set at 25%. A preferable range of Co is 15% to 20%.

Cr is an element that improves an oxidation resistance and a high-temperature corrosion resistance by forming a dense oxide film comprising $Cr_2O_3$ on a surface. Cr must be contained by at least 12% in order to use a Ni-base alloy for a high-temperature member as an object of the present invention. If Cr more than 20% is added however, a σ phase precipitates and the ductility and the fracture toughness of the material deteriorate. Consequently, an upper limit of Cr is set at 20%. A preferable range of Cr is 12% to 18%. A yet preferable range of Cr is 13% to 17%.

Al is an element that forms a γ' Ni₃ (Al, Ti) phase, and is indispensable for strengthening a γ' phase strengthening type heat resistant alloy. Further, Al contributes also to an oxidation resistance by forming Al₂O₃. In the alloy, an Al quantity is a main factor that dominates the solid solution temperature and the precipitation quantity of a γ' phase, and the quantity of the γ' phase precipitated by aging is small and a sufficiently high strength is not obtained if Al is insufficient. In contrast, when the Al quantity is excessive, weldability is hindered. Consequently, a lower limit and an upper limit of the Al quantity are set at 2.0% and 3.6%, respectively. A more preferable range of Al is 2.4% to 3.5%.

Mo and W have an effect of strengthening a matrix by the solid solution strengthening. An alloy according to the present invention does not contain elements, such as Ti, Nb and Ta, that are added to an ordinary Ni-base heat resistant alloy as strengthening elements and hence Mo and W are added comparatively abundantly. The elements must be added by 5.0% or more in order to obtain a sufficiently high strength. If the elements exceed 12% however, a generation of a hard and brittle intermetallic compound phase is enhanced and a high-temperature forgeability deteriorates. A preferable range of the elements is 5% to 10%. A yet preferable range of the elements is 6% to 9%.

C improves a tensile strength at a high temperature by dissolving in a matrix and also improves a grain boundary strength by forming carbides such as MC and $M_{23}C_6$. The effects appear from the C content of about 0.001%, and conspicuous from about 0.01%. Excessive C addition however causes coarse eutectic carbide to appear and toughness to deteriorate and hence upper limit of C is set at 0.15%. That is to say, a preferable addition quantity of C is 0.01% to 0.15%. A more preferable addition quantity of C is 0.05% to 0.12%.

B strengthens grain boundaries with a trifle amount of addition and has an effect of improving a creep strength. Excessive addition of B however causes a harmful phase to precipitate and partial melting to occur due to a lowering of the melting point and hence an appropriate range of B is set at 0.001% to 0.03%.

Although an ordinary Ni-base heat resistant alloy contains such elements as Ti, Nb and Ta as strengthening elements, the alloy according to the present invention does not contain such elements. Ti, Nb and Ta are elements that stabilize a γ' phase and contribute to an increase of the high-temperature strength but the elements raise the solid solution temperature. In the present invention in order to secure both weldability and low-temperature aging property, the solid solution temperature is lowered to a minimum and a γ' phase is stabilized by using Al so as to increase the precipitation quantity of the γ' phase.

Figure 1:
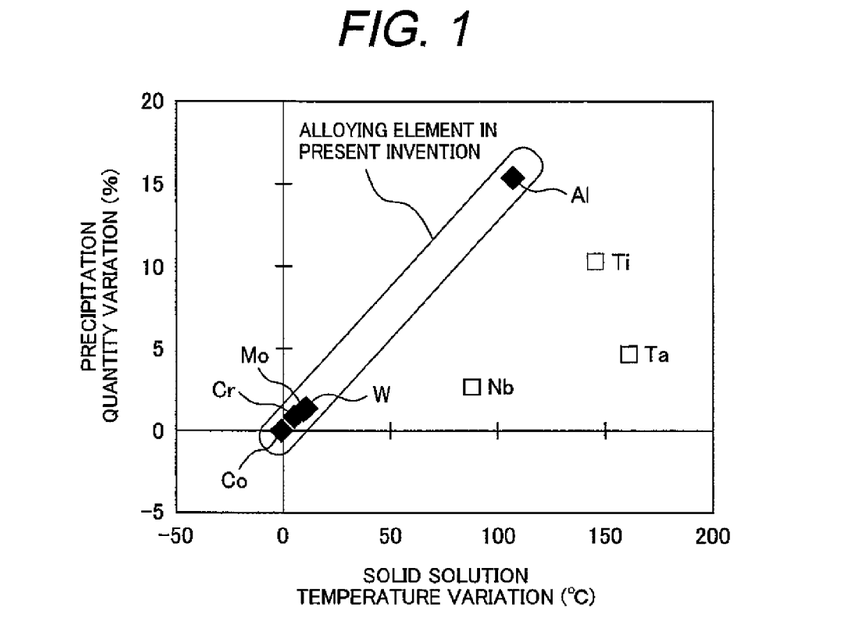
FIG. 1 is a graph showing an influence of each alloying element on a solid solution temperature and a precipitation quantity of a γ' phase.

FIG. 1 shows a variation of a γ' phase solid solution temperature and a variation of a γ' phase precipitation quantity at 700° C. when each of the alloying elements is increased by 1 mass %. Al, Ti, Nb and Ta have larger phase stabilization effects than Co, Cr, Mo and W. Further, it is understood from this figure that Ti, Nb and Ta raise the solid solution temperature considerably but do not so much increase the precipitation quantity as Al. In order to obtain both weldability and aging property, it is effective to lower the solid solution temperature to the lowest level and stabilize the γ' phase by not adding Ti, Nb and Ta but adding only Al so as to increase the γ' phase precipitation quantity.

Further, parameters for evaluating the stability of a γ' phase are defined as follows in the present invention. The quantity of each element is represented by mass %.

Parameter F is represented by the following expression (1).

$$F = 15.45 \times (\text{Al quanity}) + 0.1 \times (\text{Co quantity}) + \\ 0.8 \times (\text{Cr quantitiy}) + 1.15 \times (\text{Mo quantity}) + 1.3 \times (\text{W quantity}) \quad (1)$$

The parameter F is a parameter related to the precipitation quantity of the γ' phase at 700° C. The coefficients in the expression are determined from the results obtained by variously investigating the influence of the elements on the γ' phase precipitation quantity. The elements Co, Cr, Mo and W have smaller coefficients and less influence the γ' phase precipitation quantity than Al.

By using the parameter, it is possible to estimate the γ' phase precipitation quantity at a high temperature. Further, as the value of F increases, the quantity of the γ' phase increases and therefore the strength of the alloy increases. It is desirable to precipitate the γ' phase by 10% or more at 700° C. as a steam turbine material and for that purpose it is necessary to adjust the components of the elements so that the value F may exceed 54. A preferable composition is to be adjusted so that the value F may exceed 56.

Parameter T is represented by the following expression (2).

$$T = 108 \times (\text{Al quantity}) - (\text{Co quantity}) + 4.5 \times (\text{Cr quantity}) + 9 \times (\text{Mo quantity}) + 10.5 \times (\text{W quantity}) \quad (2)$$

Meanwhile, the parameter T is a parameter related to the solid solution temperature of a γ' phase. When the value of T increases, the solid solution temperature of the γ' phase rises and thereby it tends to be difficult to weld the material. In order to secure an appropriate weldability, it is desirable to lower the γ' phase solid solution temperature to a temperature lower than 850° C. and for that purpose it is necessary to control the value of T so as not to exceed 505. A preferable range of the value T is less than 480.

Both of the values F and T are functions of Al, Co, Cr, Mo and W and hence it is impossible to control the values individually. By selecting a composition satisfying both the ranges of F and T simultaneously, it becomes possible to obtain an alloy simultaneously having strength, reliability and weldability at a joint.

Here, the coefficients in the expressions (1) and (2) are determined on the basis of the variations of the γ' precipitation quantity and the solid solution temperature when the elements increase or decrease by 1%.

The chemical compositions of alloys of the present invention and comparative examples used for the experiments in the process to reach the present invention are shown in Table 1.

TABLE 1

| Alloy No. | Alloy composition (mass %) | | | | | | | | | | γ' phase precipitation quantity (%) | γ' phase solid solution temperature (° C.) | Parameter F | Parameter T | Category |
|---|---|---|---|---|---|---|---|---|---|---|---|---|---|---|---|
| | Ni | Al | Co | Cr | Mo | W | C | B | Ti | Nb | Ta | | | | | |
| 1 | Bal. | 2.7 | 12.0 | 12.0 | 9.0 | 0.0 | 0.060 | 0.004 | — | — | — | 16 | 813 | 60 | 415 | alloy of |
| 2 | Bal. | 2.4 | 12.0 | 12.0 | 9.0 | 0.0 | 0.060 | 0.004 | — | — | — | 13 | 781 | 56 | 382 | the |

TABLE 1-continued

| Alloy No. | Alloy composition (mass %) | | | | | | | | | | γ' phase precipitation quantity (%) | γ' phase solid solution temperature (° C.) | Parameter F | Parameter T | Category |
|---|---|---|---|---|---|---|---|---|---|---|---|---|---|---|---|
| | Ni. | Al | Co | Cr | Mo | W | C | B | Ti | Nb | Ta | | | | | |
| 3 | Bal. | 2.1 | 12.0 | 16.0 | 8.0 | 1.5 | 0.060 | 0.004 | — | — | — | 12 | 773 | 55 | 375 | present |
| 4 | Bal. | 3.4 | 24.5 | 18.0 | 0.0 | 7.5 | 0.012 | 0.100 | — | — | — | 23 | 830 | 74 | 502 | invention |
| 5 | Bal. | 3.1 | 20.0 | 16.0 | 5.9 | 0.0 | 0.020 | 0.005 | — | — | — | 19 | 820 | 65 | 440 | |
| 6 | Bal. | 3.6 | 20.0 | 16.0 | 5.9 | 1.0 | 0.020 | 0.005 | — | — | — | 25 | 838 | 75 | 504 | |
| 7 | Bal. | 2.6 | 20.0 | 16.0 | 7.0 | 0.0 | 0.020 | 0.005 | — | — | — | 14 | 798 | 59 | 396 | |
| 8 | Bal. | 2.6 | 20.0 | 18.0 | 2.0 | 6.5 | 0.020 | 0.005 | — | — | — | 16 | 825 | 63 | 428 | |
| 9 | Bal. | 0.8 | 15.0 | 16.0 | 0.0 | 8.0 | 0.020 | 0.010 | — | — | — | 5 | 722 | 34 | 227 | Comparative |
| 10 | Bal. | 1.8 | 20.0 | 12.0 | 0.5 | 3.8 | 0.050 | 0.005 | — | — | — | 6 | 739 | 41 | 273 | example |
| 11 | Bal. | 4.0 | 22.0 | 18.0 | 0.0 | 8.0 | 0.020 | 0.010 | — | — | — | 38 | 884 | 84 | 575 | |
| 12 | Bal. | 3.5 | 12.0 | 15.5 | 4.8 | 9.0 | 0.100 | 0.005 | — | — | — | 36 | 871 | 82 | 573 | |
| 13 | Bal. | 0.1 | 20.0 | 20.0 | 5.9 | 0.0 | 0.020 | 0.005 | 2.2 | — | — | 12 | 940 | — | — | Known alloy |
| 14 | Bal. | 0.2 | 0.0 | 21.5 | 9.0 | 0.0 | 0.050 | 0.010 | 0.2 | 3.6 | — | 8 | 880 | — | — | |
| 15 | Bal. | 1.3 | 0.0 | 16.0 | 1.6 | 0.0 | 0.080 | 0.008 | 1.7 | 2.0 | — | 21 | 960 | — | — | |
| 16 | Bal. | 1.3 | 13.5 | 19.5 | 4.3 | 1.0 | 0.080 | 0.006 | 3.0 | — | 0.2 | 25 | 980 | — | — | |

Nos. 1 to 8 represent alloys of the present invention and Nos. 9 to 12 represent comparative examples. Nos. 13 to 16 represent currently used Ni-base alloys as known alloys. The difference of the known alloys from the other alloys is that Ti, Nb and Ta are added to the known alloys as alloying elements. The parameters F and T of the alloys are also shown in Table 1. In the comparative examples of Nos. 9 and 10 and Nos. 11 and 12, the values of F and T deviate from the scope of the present invention, respectively.

Figure 2:
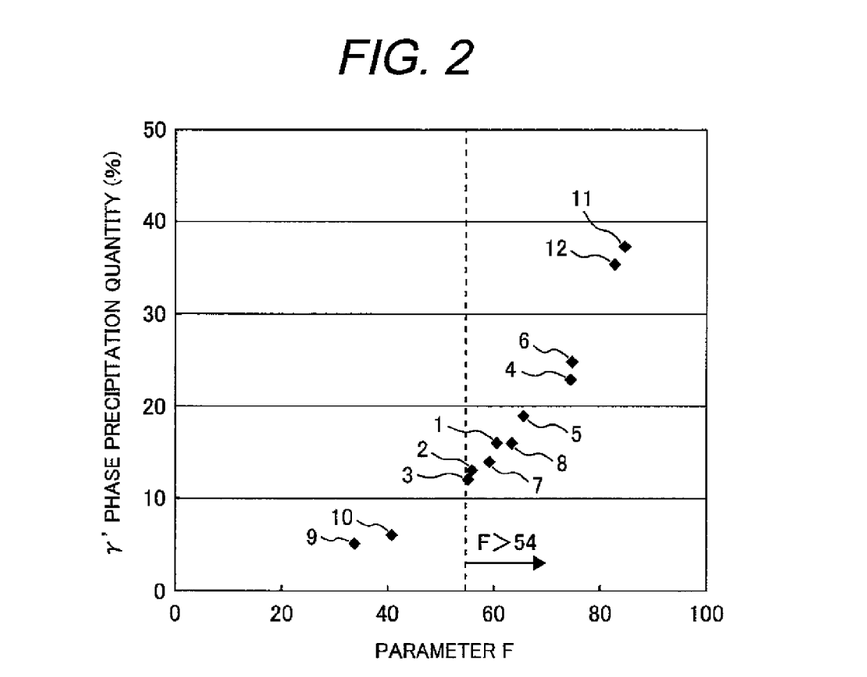
FIG. 2 is a graph showing a correlation between a parameter F and the γ' phase precipitation quantity.
Figure 3:
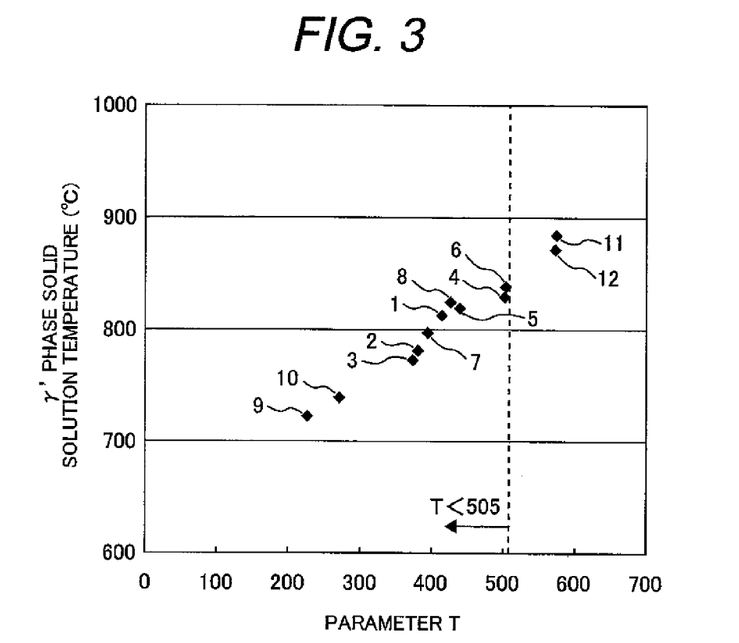
FIG. 3 is a graph showing a correlation between a parameter T and the γ' phase solid solution temperature.

FIGS. 2 and 3 are the graphs showing the correlation between the γ' phase precipitation quantity (at 700° C.) and the parameter F and the correlation between the γ' phase solid solution temperature and the parameter T, respectively, shown in the table. It is obvious that the precipitation quantity tends to increase as the parameter F increases. In the case of an alloy satisfying the expression F>54, a precipitation quantity of 10% or more is obtained at 700° C. In the same way, an obvious correlation exists between the solid solution temperature and the parameter T and the solid solution temperature is 840° C. or lower as long as the expression T<505 is satisfied.

Each of alloy ingots, 10 kg each in weight, having those compositions is produced by vacuum melting and formed into a shape of a round bar 15 mm in diameter by hot working at 1,000° C. to 1,150° C. After the round bars are subjected to a solution treatment for 2 hours at 980° C., a primary aging treatment for 8 hours at 840° C., and a secondary aging treatment for 24 hours at various temperatures in the range of 600° C. to 730° C., tensile creep test pieces (30 mm in parallel part length and 6 mm in diameter) are produced by machining.

Figure 4:
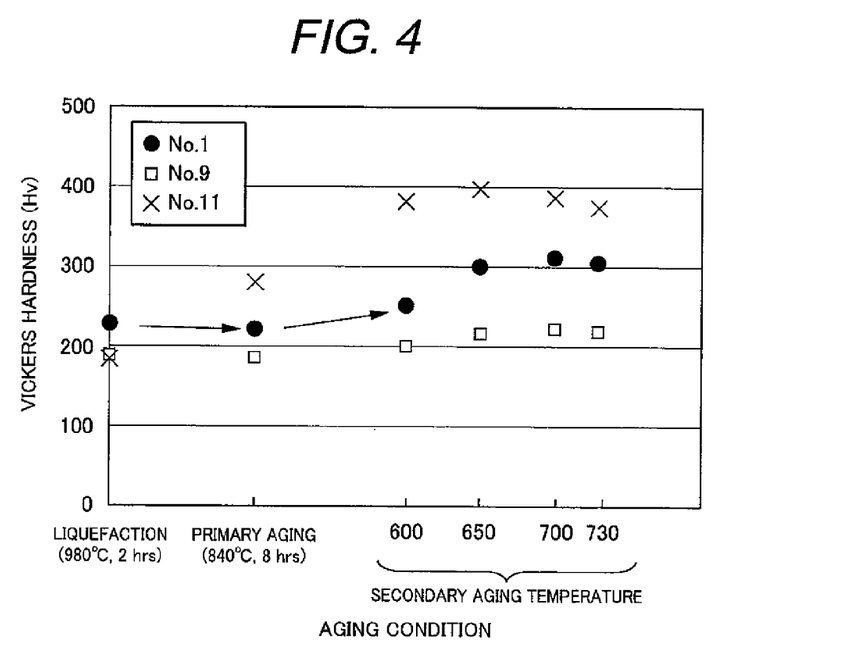
FIG. 4 is a graph showing a relationship between a hardness and an aging temperature in alloys of the present invention and comparative examples.

FIG. 4 shows aging properties of the alloy of the present invention (No. 1) and the comparative examples (Nos. 9 and 11). In the case of No. 1, the Vickers hardness Hv after solution treatment is 220 and the hardness does not increase even after the primary aging is applied. This is because the value T is low and a γ' phase does not precipitate at the primary aging temperature. Although the primary aging is effective for improving the ductility of a Ni-base alloy, a ferritic steel conspicuously loses the properties when it is heated to the temperature range and hence the primary aging must be applied before joining. In the case of the alloy having a high T value like No. 11 however, the γ' phase precipitates and the hardness increases undesirably through the primary aging and resultantly the weldability deteriorates. In the case of the alloy of the present invention, T is not more than the stipulated value and hence the hardness does not increase and a good weldability is maintained even though the primary aging is applied.

No. 1 alloy is strengthened by precipitation at the succeeding secondary aging and the hardness increases. The hardness increases conspicuously at an aging temperature of 650° C. or higher, and the hardness increases most at 650° C. to 700° C. in the cases of the other alloys of the present invention, too. In the case of No. 9 alloy, although the hardness does not increase after the primary aging, the increase of hardness caused by the secondary aging is also small in comparison with the alloy of the present invention. This is because the value F is low and the precipitation quantity of the γ' phase is small.

Figure 5:
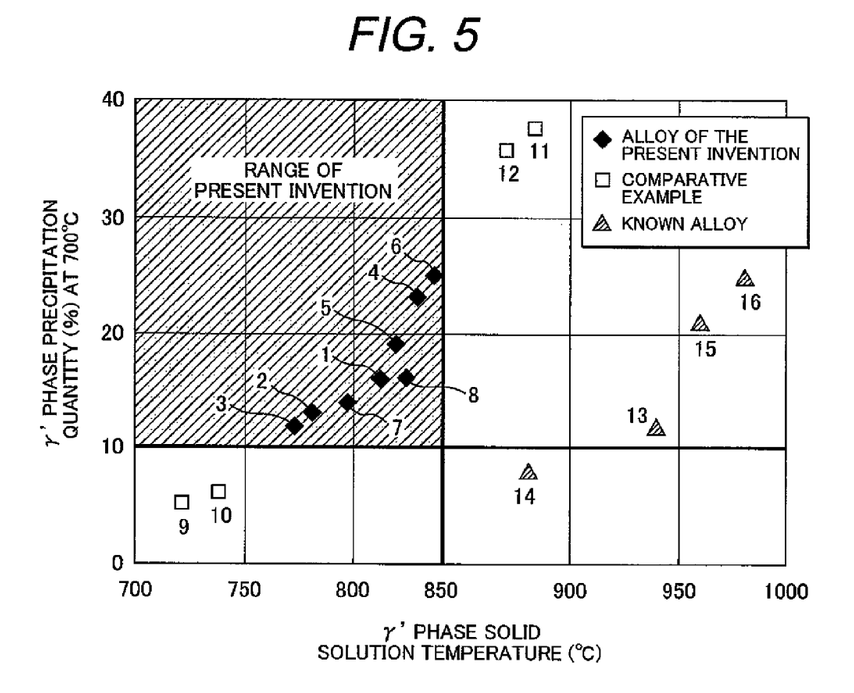
FIG. 5 is a graph showing a correlation between the γ' phase solid solution temperature and the precipitation quantity of each alloy.

FIG. 5 shows the correlation between the solid solution temperature and the precipitation quantity of the γ' phase in each alloy. The known alloy containing Ti, Nb and Ta as the strengthening elements has a higher solid solution temperature than the alloys of the present invention and comparative examples even though the precipitation quantities are at an identical level and the alloy of the present invention is excellent from the viewpoint of weldability. When joint by welding with a ferritic steel is intended, it is desirable that the solid solution temperature is 840° C. or lower and it is necessary that the γ' phase precipitation quantity is 10% or more from the viewpoint of the creep strength. All alloys of the present invention satisfy the requirements. By selecting the alloy composition and controlling the solid solution temperature and the precipitation quantity of a γ' phase properly so that the parameters F and T represented by the expressions (1) and (2) may satisfy the expressions F>54 and T<505 respectively, a Ni-base alloy excellent in weldability and aging properties and suitable for joint with the ferritic steel is obtained.

Figure 6:
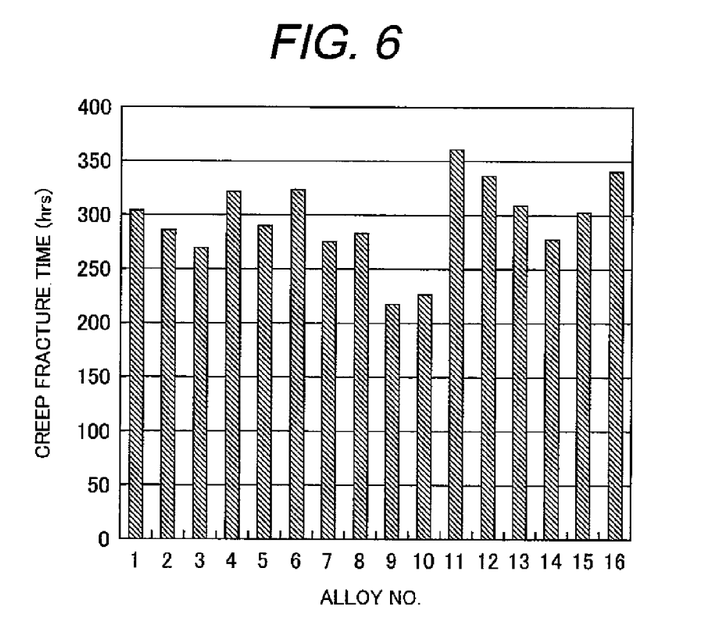
FIG. 6 is a graph showing creep fracture times of each alloys.
Figure 7:
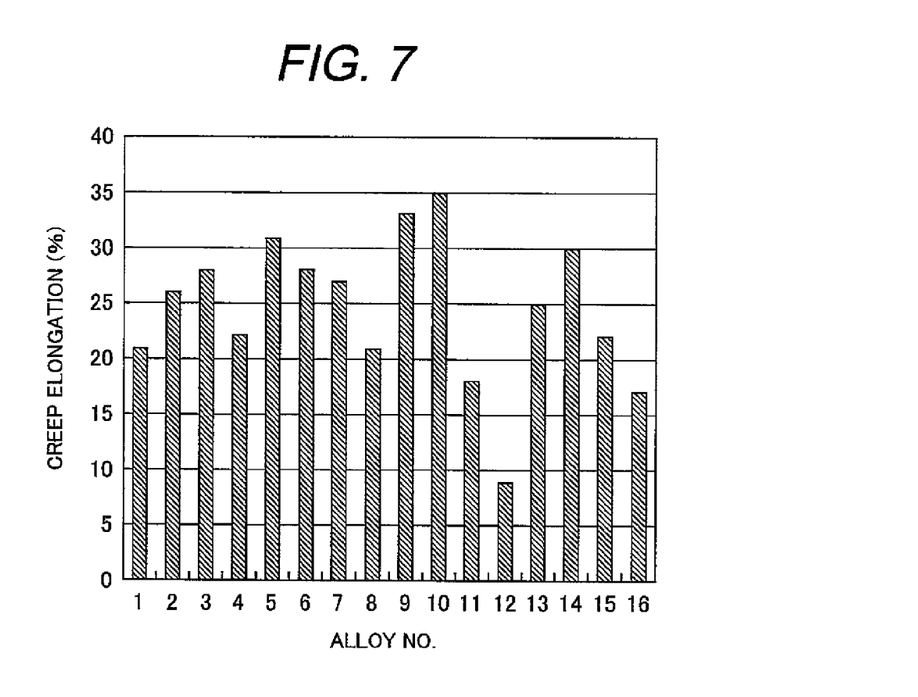
FIG. 7 is a graph showing creep fracture elongations of each alloys.

A creep fracture time and an elongation of each alloy are shown in FIGS. 6 and 7, respectively. The secondary aging temperature of the samples is set at 650° C. and the creep test conditions are 700° C. and 294 MPa.

As shown in FIG. 6, the fracture time of the alloys of the present invention are about 300 hours. The time corresponds to a heatproof temperature of 700° C. in a steam turbine. Consequently, it is obvious that the alloys of the present invention are better in the high-temperature strength than a conventional ferritic heat resistant steel having the heatproof temperature of 630° C. and sufficient reliability is obtained when a joining structure is manufactured with the alloys of the present invention.

Further, as it is obvious from FIG. 7, in the cases of the alloys of the present invention, it is confirmed that creep elongations of around 20% are obtained and the high-temperature ductility is at a practically usable level. In the cases of Nos. 11 and 12 among the comparative examples, the precipitation strengthening by the γ' phase is insufficient and hence the fracture time is short and sufficient joint strength is not obtained.

Figure 8:
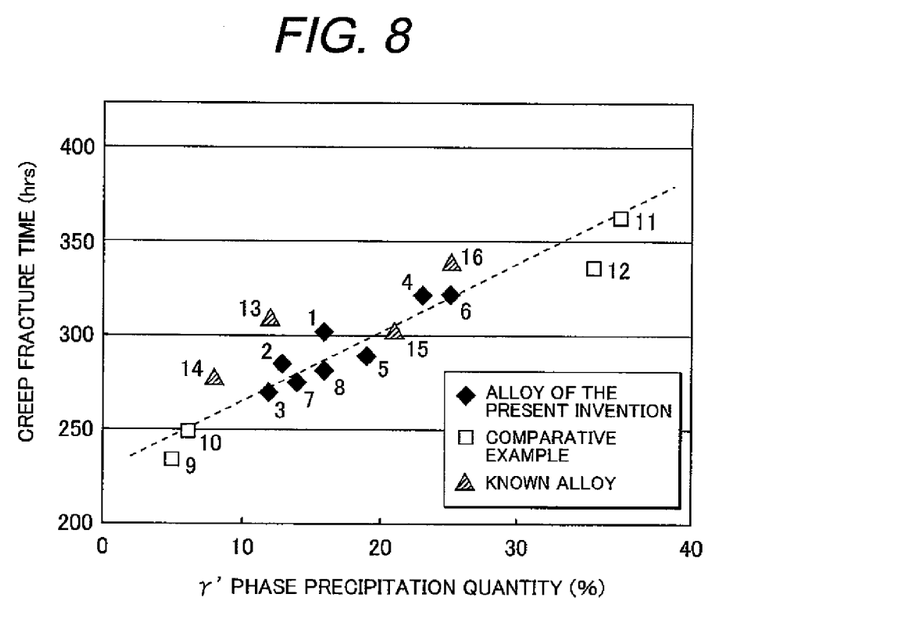
FIG. 8 is a graph showing a relationship between the γ' phase precipitation quantity and the creep fracture time.

FIG. 8 is a graph showing the correlation between the γ' phase precipitation quantity and the creep fracture time. As the γ' phase precipitation quantity increases, the creep fracture time also tends to increase. In the cases of the alloys Nos. 11 and 12 and the alloys Nos. 13 to 16 to which Ti, Nb and Ta are added, although the creep fracture time is long and they are excellent in strength, the γ' phase solid solution temperature is high as it is understood from FIG. 5 and hence welding becomes difficult.

An alloy according to the present invention is used for the rotor shaft and the intermediate ring of a steam turbine for electric power generation and moreover can be used as a weld metal by forming it into a weld wire or a weld rod.

A welded turbine rotor according to the present invention is explained hereunder.

A preferable method for manufacturing a welded rotor is as follows. A second Ni-base alloy is welded to a first Ni-base alloy as it is after forging or after solution treatment is further applied. The metal used for the welding is preferably an alloy mainly composed of the first Ni-base alloy or the second Ni-base alloy. The second Ni-base alloy is better particularly from the viewpoint of weldability. The second Ni-base alloy may be built up onto the first Ni-base alloy as the weld material.

After the second Ni-base alloy is joined to the first Ni-base alloy, the material is subjected to the solution treatment at a temperature not lower than the γ' phase solid solution temperature of the first Ni-base alloy and thereafter to an intermediate aging treatment in a temperature range of the solid solution temperature of the second Ni-base alloy to 900° C. or lower.

After the intermediate aging treatment is applied, a ferritic steel is welded to the structure comprising the first Ni-base alloy and the second Ni-base alloy. As the weld metal, either the second Ni-base alloy or the ferritic steel is selected and used. It is preferable to use the ferritic steel from the viewpoint of the easiness of inspection after welding. After the ferritic steel is welded, the residual stress at the ferritic steel welded part is completely relieved at 650° C. to 700° C., the γ' phase is precipitated in the second Ni-base alloy, and the γ' phase precipitated at the intermediate aging is further increased in the first Ni-base alloy.

If the residual stress at the ferritic steel part is not relieved, creep damage advances due to the weld residual stress and the temperature load during service and the creep life shortens extremely. The creep strength of the joint between the Ni-base alloy and the ferritic steel is determined by the creep strength on the side of the ferritic steel. Since the creep strength of the Ni-base alloy is overwhelmingly higher than that of the ferritic steel, the creep life on the side of the Ni-base alloy is not a problem even when residual stress remains on a side of the Ni-base alloy.

Here, since the γ' phase hinders weldability, it is necessary that the γ' phase does not precipitate in the second Ni-base alloy during the welding to the ferritic steel, namely even after subjected to the intermediate aging treatment. Also, it is necessary to obtain a required strength by precipitating the γ' phase through the aging at 650° C. to 700° C.

In order to grant an effective proof stress to the second Ni-base alloy at a temperature of 650° C. or lower, it is necessary to precipitate the γ' phase by 10% or more. In contrast, when the quantity of the γ' phase exceeds 25%, the γ' phase precipitates during cooling after the intermediate aging treatment and hinders the weldability. Consequently, the quantity of the γ' phase precipitating at the aging treatment at 650° C. to 700° C. is preferably in the range of 10% to 25% by volume.

The solid solution temperature of a γ' phase and the precipitation quantity of the γ' phase at a low temperature have a correlation. In the case of an ordinary Ni-base alloy, the precipitation quantity of the γ' phase is about 5% at 700° C. when the solid solution temperature is 800° C. The second Ni-base alloy must be a Ni-base alloy having properties different from a conventional Ni-base alloy. Preferable chemical components of the second Ni-base alloy necessary for obtaining the properties and a chemical affinity with the ferritic steel are as follows.

Cr is an element important for securing corrosion resistance and is added by 10 to 18 mass %. Usually Cr must be added by 15 mass % or more in order to use a Ni-base alloy at a high temperature. If Cr is added excessively however, a σ phase known as an embrittlement phase precipitates and hence Cr is added at most by about 23 mass % in general. In the present invention, however, the temperature at which the second Ni-base alloy is used is 650° C. or lower and hence Cr may be added by 10% or more. Further, if Cr diffuses toward the side of a ferritic steel when the second Ni-base alloy and the ferritic steel are welded to each other, a harmful δ ferrite phase precipitates in the ferritic steel in the vicinity of the interface. Consequently, Cr is desirably controlled to 18 mass % or less.

Nb, Ti and Ta stabilize the γ' phase up to a high temperature and have an effect of increasing strength, but do not contribute to the stabilization of the γ' phase at a temperature of 700° C. or lower. Consequently, it is preferable in the present invention that the elements are not added and not substantially contained in the alloy. By not using the elements, it is possible to lower the solid solution temperature and at the same time increase the γ' phase precipitation quantity at a low temperature. Nb, Ti and Ta stabilize the γ' phase and increase strength at a high temperature and hence have been regarded as indispensable elements in a conventional Ni-base forging alloy (for example, refer to Document 4 (Japanese Patent Laid-open No. 2005-97650)). The concept of the present invention is different from the conventional alloy design concept in this aspect.

Co is a solid solution strengthening element and contributes to the improvement of strength. In contrast, Co undesirably stabilizes a σ phase that is a harmful phase. Consequently, the quantity of Co must be regulated to 23 mass % or less.

Heat resistant elements such as W and Mo render the solid solution strengthening to the matrix where the γ' phase precipitates, and have the effects of lowering a diffusion coefficient and controlling the coarsening of the γ' phase at a high temperature. Consequently, it is desirable to add the heat resistant elements such as W and Mo by 5 mass % or more. On the other hand, the heat resistant elements stabilize a σ phase and a μ phase that are harmful phases. Further, the solid solution strengthening is maintained up to a high temperature and adversely influences weldability even at a temperature not lower than the γ' phase solid solution temperature and hence the addition quantity of the heat resistant elements is desirably 12 mass % or less.

First Embodiment

Figure 11A:
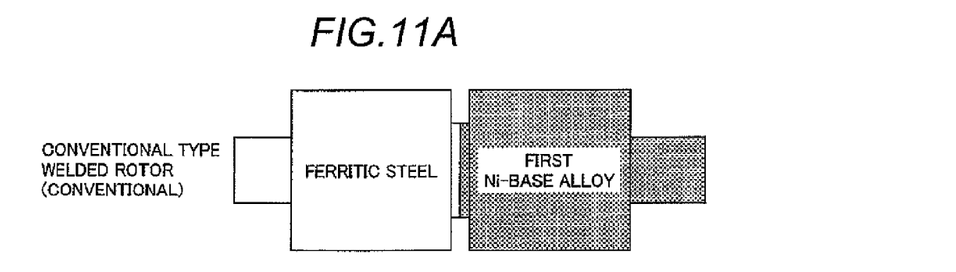
FIGS. 11A, 11B, and 11C are views showing configurations of welded rotors.
Figure 11B:
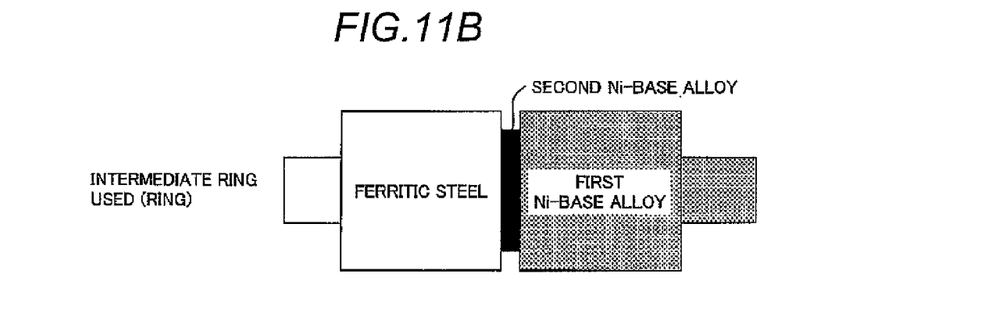
Figure 11C:
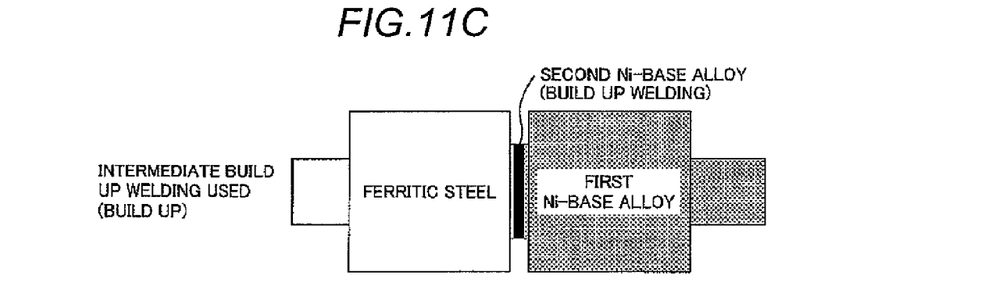

The examples of structure of a welded rotor for a steam turbine are shown in FIGS. 11A to 11C. FIG. 11A represents a conventional welded rotor formed and welded by using a Ni-base alloy on a high-temperature side and a ferritic steel on a low-temperature side. FIG. 11B represents a welded rotor manufactured by forming an intermediate ring with a second Ni-base alloy and welding it to a Ni-base alloy on a high-temperature side and a ferritic steel on a low-temperature side. FIG. 11C represents a welded rotor manufactured by building up by welding a second Ni-base alloy onto a Ni-base alloy on a high-temperature side and a ferritic steel on a low-temperature side.

When the difference in a linear expansion coefficient between the Ni-base alloy on the high-temperature side and the ferritic steel is very large as is the case with the large turbine rotor, it is preferable to alleviate the difference of the linear expansion coefficient by inserting an intermediate ring in between as shown in FIG. 11B. Further, it is possible to use the second Ni-base alloy in the same way as the ring as the weld metal when the ring is welded to the Ni-base alloy and the ferritic steel. In contrast, in the case of materials having a small difference of the linear expansion coefficient, the structure shown in FIG. 11C is effective.

The method for manufacturing a welded rotor shown in FIG. 11B is as follows.

Firstly, the intermediate ring comprising the second Ni-base alloy is welded to the first Ni-base alloy. After the first and second Ni-base alloys are welded, the solution treatment is applied. After the solution treatment, the stabilizing aging treatment is applied. Meanwhile, the quench-and-temper treatment is applied to a ferritic steel beforehand. The ferritic steel is welded to the Ni-base alloy already subjected to the stabilizing aging treatment. The aging treatment is applied to the welded turbine rotor, and then the stress relief treatment at the ferritic steel part and precipitation strengthening treatment at the Ni-base alloy part are applied.

In the welded turbine rotor according to the present invention, the second Ni-base alloy is interposed between the nickel member and the steel member, and is welded to both the members.

Second Embodiment

As Example 2, the composition and physical properties of a second Ni-base alloy according to the present invention are explained in comparison with a conventional first Ni-base alloy. The chemical components of the samples are shown in Table 2. Each of the samples is produced by a high frequency melting, forged, and formed into a plate.

Figure 9:
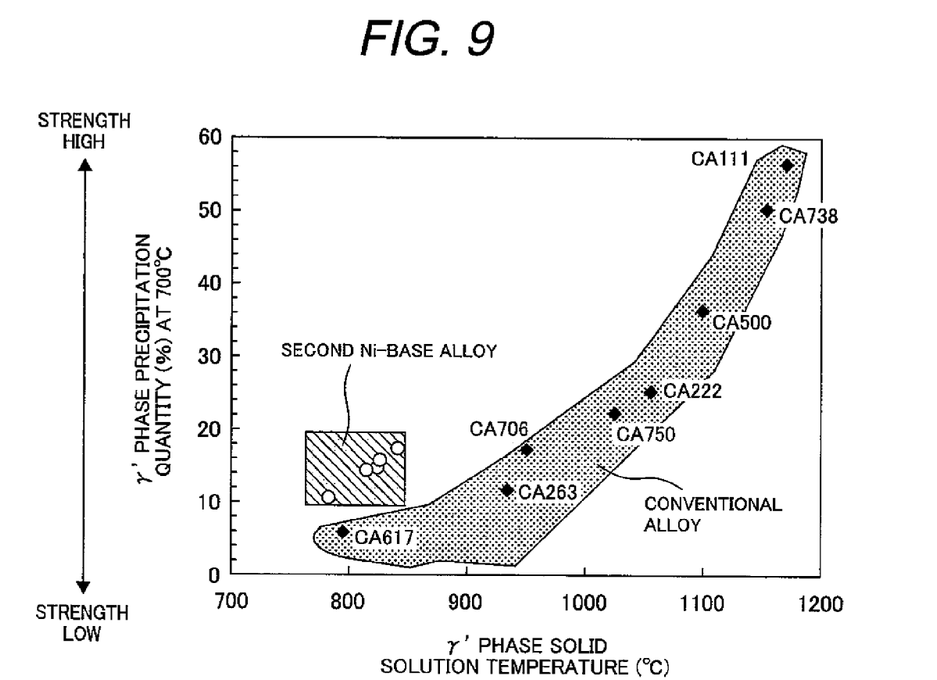
FIG. 9 is a graph showing a relationship between the γ' phase solid solution temperature and the γ' phase precipitation quantity at 700° C.

The relationship between the $\gamma'$ phase solid solution temperature and the $\gamma'$ phase precipitation quantity (area percent) at 700° C. is shown for each alloy in FIG. 9. The solid solution temperature of the $\gamma'$ phase is determined by a thermal differential analysis. In the thermal differential analysis, after the $\gamma'$ phase is precipitated by the solution aging treatment, a sample is heated, and the solid solution temperature is determined on the basis of the temperature at which reaction heat generated when the $\gamma'$ phase dissolves is detected. The $\gamma'$ phase precipitation quantity at 700° C. is determined by subjecting the sample to aging for a long time at 700° C., thereafter applying an SEM observation, and applying image analysis to an SEM image. As the long time aging treatment, a treatment of about 48 hours is appropriate.

In the case of a conventional material, as the $\gamma'$ phase solid solution temperature rises, the $\gamma'$ phase precipitation quantity at 700° C. increases, the precipitation strengthening of the $\gamma'$ phase is enhanced, and a high strength is obtained. Regarding an alloy of CA 617 or the like, although the solid solution temperature of the $\gamma'$ phase is about 800° C., the $\gamma'$ phase precipitation quantity at 700° C. is about 5% and an effective strength is not obtained. In the case of CA 263, although the precipitation quantity of the $\gamma'$ phase is sufficient, the solid solution temperature is 900° C. or higher and the $\gamma'$ phase that deteriorates weldability at the intermediate aging treatment of 800° C. to 850° C. precipitates.

In the case of a Ni-base alloy (the second Ni-base alloy) that does not substantially contain Ti, Ta and Nb and comprises 0.001 to 0.1 mass % C, 10 to 20 mass % Cr, 2.0 to 3.0 mass % Al, and 5 to 12 mass % W and Mo in total, even when the $\gamma'$ phase solid solution temperature is about 850° C., the $\gamma'$ phase of 10% or more can precipitate at 700° C. Consequently, the $\gamma'$ phase that deteriorates weldability does not precipitate at the intermediate aging treatment and a sufficiently high strength can be obtained with stress relief treatment at 650° C. to 700° C.

Successively, solution treatment, intermediate aging treatment (aging 1), and stress relief treatment (aging 2) are applied to each alloy and the structure is observed. The results of the observation are classified and shown in FIG. 10.

Figure 10:
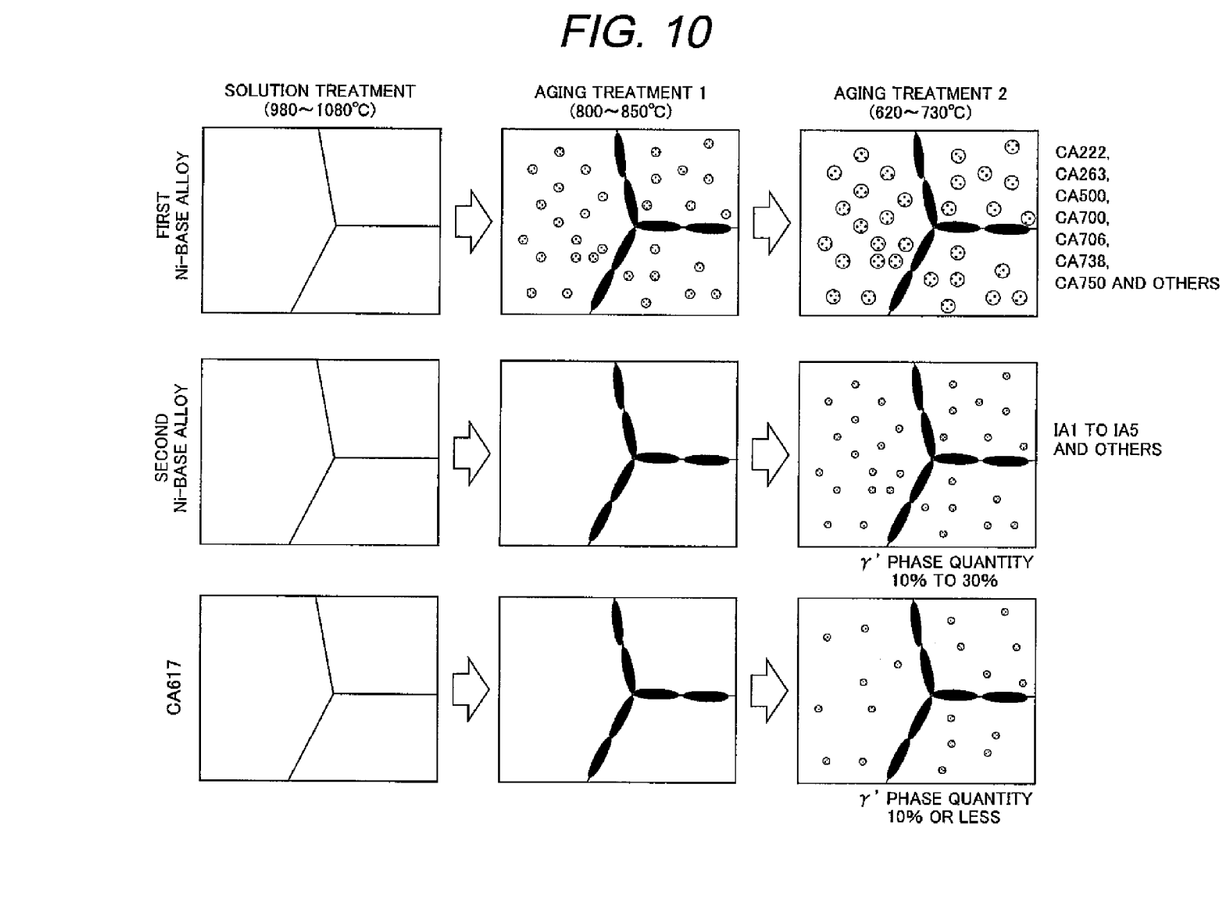
FIG. 10 comprises schematic views showing structure changes of samples.

In the case of the first Ni-base alloy that is a conventional Ni-base alloy such as CA 263, carbide and the like precipitate at grain boundaries and the $\gamma'$ phase also precipitates through the aging 1. The $\gamma'$ phase grows through the aging 2.

In the case of the second Ni-base alloy, although carbide and the like precipitate at grain boundaries through the aging

TABLE 2

| | Chemical component of sample (mass %) | | | | | | | | | |
|---|---|---|---|---|---|---|---|---|---|---|
| Material name | C | Ni | Cr | Mo | Co | Al | Ti | W | Nb | Ta |
| CA706 | 0.03 | 42 | 16 | 0 | 0 | 1.3 | 1.7 | 0 | 2.0 | 0 | Bal. Fe
| CA500 | 0.08 | Bal. | 8.3 | 0.49 | 9.2 | 5.4 | 0.8 | 9.4 | 0 | 3.19 |
| CA750 | 0.05 | Bal. | 19.5 | 4.3 | 13.5 | 1.3 | 3 | 0 | 0 | 0 |
| CA222 | 0.11 | Bal. | 22 | 0 | 20 | 1.18 | 2.28 | 2 | 0.8 | 1.01 |
| CA738 | 0.12 | Bal. | 22.9 | 0 | 20.6 | 1.6 | 2.8 | 7.1 | 0.9 | 1.18 |
| CA111 | 0.12 | Bal. | 15.00 | 3 | 15 | 1.6 | 3 | 7.1 | 0.9 | 1.18 |
| CA141 | 0.03 | Bal. | 19.0 | 10.2 | 0 | 1.58 | 1.38 | 0 | 0 | 0 |
| CA263 | 0.03 | Bal. | 20 | 6 | 20 | 0.4 | 1.7 | 0 | 0 | 0 |
| IA1 | 0.03 | Bal. | 13 | 3 | 0 | 2.7 | 0 | 6 | 0 | 0 |
| IA2 | 0.04 | Bal. | 12 | 8 | 5 | 2.8 | 0 | 0 | 0 | 0 |
| IA3 | 0.03 | Bal. | 15 | 9 | 10 | 2.9 | 0 | 0 | 0 | 0 |
| IA4 | 0.001 | Bal. | 16 | 5 | 20 | 3.0 | 0 | 1 | 0 | 0 |
| IA5 | 0.01 | Bal. | 11 | 7 | 12 | 2.5 | 0 | 0 | 0 | 0 |

1, the γ' phase does not precipitate. The γ' phase precipitates by 10% to 30% through the aging 2.

In the case of CA 617 that is a conventional Ni-base alloy, the γ' phase precipitates through the aging 2 as stated above but the precipitation quantity is small.

Third Embodiment

Various material tests are carried out on an assumption that a welded rotor for a steam turbine in the First Embodiment is manufactured.

The structures of the welded rotors (conventional: FIG. 11A, ring: FIG. 11B, and build up: FIG. 11C), heat treatment processes and the combinations of the used intermediate material (the second Ni-base alloy) are shown in Table 3. CA 706 is used as the Ni-base alloy for the high-temperature part and a ferritic steel (C, 0.15 mass %, Cr: 10 mass %, Mo: 1.3 mass %, W: 0.3 mass %, Nb: 0.1 mass %, and the remainder Fe) is used for the lower temperature part.

The property evaluation results for the combinations of the above materials, structures, and heat treatments are shown together in Table 3. The tensile ductility of the first Ni-base alloy at 700° C. is shown as an index of the property evaluation. This is the index of high-temperature ductility that is to be a problem of the first Ni-base alloy. With regard to the second Ni-base alloy, 0.2% proof stress at 650° C. is shown. With regard to the ferritic steel too, 0.2% proof stress at 650° C. is shown.

In the case of the rotor 1, the ductility of the first Ni-base alloy is not secured. In the case of the welded rotor 2, even though the ductility of the first Ni-base alloy is improved, since the ferritic steel is exposed to a high temperature, the strength at the ferritic steel part deteriorates considerably. In the case of the rotor 3, the strength and ductility at the Ni-base alloy and ferritic steel parts are good, but the γ' phase that deteriorates weldability precipitates on the side of the Ni-base alloy during the welding, and hence weld cracking occurs.

TABLE 3

Weldability and strength properties at rotor manufacturing

| | Rotor configuration | Weldability | Intermediate material (second Ni-base alloy) | Heat treatment | First Ni-base alloy tensile elongation at 700° C. | Ferritic steel 0.2% proof stress at 650° C. | Intermediate material 0.2% proof stress at 650° C. |
|---|---|---|---|---|---|---|---|
| Rotor 1 | Conventional | o | — | Heat treatment 1 | 5% | 400 MPa | — |
| Rotor 2 | Conventional | o | — | Heat treatment 2 | 45% | 150 MPa | — |
| Rotor 3 | Conventional | x | — | Heat treatment 3 | 40% | 420 MPa | — |
| Rotor 4 | Ring | o | IA01 | Heat treatment 1 | 5% | 400 MPa | 450 MPa |
| Rotor 5 | Ring | o | IA01 | Heat treatment 2 | 6% | 150 MPa | 410 MPa |
| Rotor 6 | Ring | o | IA01 | Heat treatment 3 | 40% | 420 MPa | 415 MPa |
| Rotor 7 | Ring | o | CA617 | Heat treatment 1 | 5% | 400 MPa | 250 MPa |
| Rotor 8 | Ring | o | CA617 | Heat treatment 2 | 16% | 150 MPa | 290 MPa |
| Rotor 9 | Ring | o | CA617 | Heat treatment 3 | 40% | 420 MPa | 275 MPa |
| Rotor 10 | Build up | o | IA01 | Heat treatment 3 | 40% | 420 MPa | 405 MPa |

The heat treatment conditions assumed in manufacturing a welded rotor are shown in Table 4. By such treatment, it is possible to give thermal history to a sample on the assumption of the welding and heat treatment operations of each member in a welded rotor. The Ni-base alloy part and the ferritic steel are welded before aging stress relief treatment. The heat treatments 1 to 3 in Table 3 correspond to the heat treatment conditions in Table 4.

TABLE 4

Heat treatment condition of the sample

| | Solution treatment | Intermediate aging | Aging stress relief |
|---|---|---|---|
| Heat treatment 1 | 980° C. × 2 hrs | Not applied | 650° C. × 8 hrs |
| Heat treatment 2 | 960° C. × 2 hrs | Not applied | 830° C. × 16 hrs |
| Heat treatment 3 | 960° C. × 2 hrs | 840° C. × 8 hrs | 630° C. × 16 hrs |

Consequently, with the rotors 1 to 3 employing a conventional structure, it is difficult to secure both high-temperature strength and ductility simultaneously.

In the cases of the rotors 4 to 9 using rings, weld cracking does not occur. In the cases of the rotors 4 and 5, however, intermediate aging treatment is not applied and hence carbide and the like do not precipitate at grain boundaries and the ductility of the first Ni-base alloy is not secured.

Further, in the cases of the rotors 7 to 9 using conventional materials as the ring materials, it is difficult to increase the strength of the intermediate material part regardless of the heat treatment conditions.

In the case of the rotor 6, the Ni-base alloy of the Second Embodiment is used as the second Ni-base alloy, and the solution treatment at 960° C., the intermediate aging treatment, and stress relief treatment (heat treatment 3) are applied. The ductility of the first Ni-base alloy and the strength of the ferritic steel part and the second Ni-base alloy are excellent. In the same way as the rotor 6, in the case of the rotor 10 manufactured by building up the second Ni-base alloy part by welding too, excellent properties are obtained in the whole rotor in the same way as the Ni-base alloy.

Fourth Embodiment

Figure 12A:
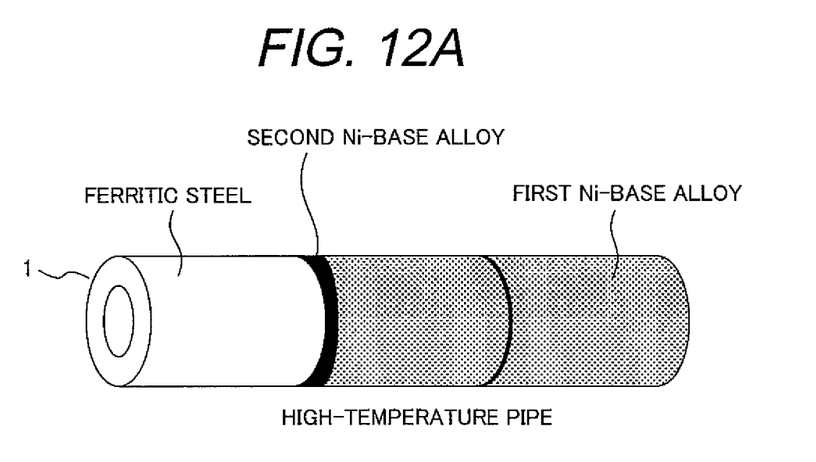
FIGS. 12A and 12B show application examples to another welded structures.
Figure 12B:
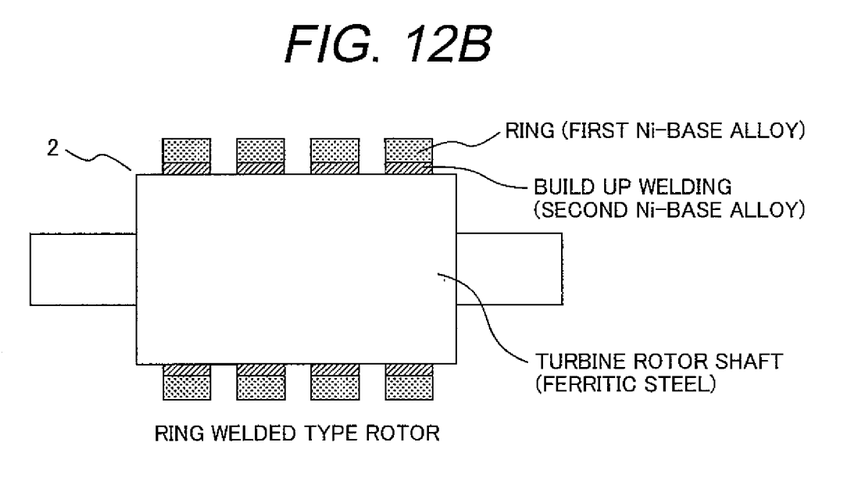

The present invention can be applied to a whole welded structure having a part of temperature gradient and comprising a Ni-base alloy at the high-temperature part and a ferritic steel at the low-temperature part, and the present invention makes it possible to obtain high strength and ductility at the whole welded part. FIGS. 12A and 12B are views showing application examples other than the welded rotors.

FIG. 12A is a view showing a configuration example of a high-temperature pipe. By applying treatments in the same way as the above examples, the ductility of the first Ni-base alloy and the strength of the ferritic steel part and the second Ni-base alloy are excellent. As a result, it is possible to improve the strength, ductility and toughness of the whole welded structure. Such a pipe can be widely used for high-temperature applications including a boiler.

FIG. 12B is a view showing the structure of a ring welded type rotor formed by engaging and welding a ring-shaped Ni-base alloy with a ferritic steel shaft. It is possible to improve the high-temperature strength and ductility of the whole welded structure by connecting the rings comprising the first Ni-base alloy to the rotor shaft material comprising the ferritic steel with the second Ni-base alloy according to the present invention.

What is claimed is:

1. A welded turbine rotor configured by integrating a nickel member comprising a first Ni-base alloy and a steel member comprising a ferritic steel through a second Ni-base alloy,
   wherein the second Ni-base alloy is interposed between the ferritic steel and the first Ni-based alloy,
   wherein the first Ni-base alloy is a Ni-base alloy having a γ' phase solid solution temperature of 900° C. or higher and a creep fracture strength at 675° C. of 100 MPa or more,
   wherein the second Ni-base alloy is a γ' phase precipitation strengthening type Ni-base alloy having a γ' phase solid solution temperature of 850° C. or lower, and a γ' phase precipitate of 10% to 25% by volume, and the second Ni-base alloy contains essentially no Ti, Nb, and Ta, and
   wherein the second Ni-base alloy includes 5 to 12 percent by mass of W and Mo in total, and 3 to 12 percent by mass of Mo.

2. The welded turbine rotor according to claim 1, wherein the second Ni-base alloy is joined by welding to the nickel member, and
   the second Ni-base alloy is joined by welding to the steel member.

3. The welded turbine rotor according to claim 1, wherein the nickel member and the steel member are welded to each other by using the second Ni-base alloy as a weld metal.

4. A steam turbine including the welded turbine rotor according to claim 1, and the steam turbine configured for operation in a main steam temperature of 675° C. or higher.

5. The welded turbine rotor according to claim 1, wherein the second Ni-base alloy is a Ni-base alloy consisting of 0.001 to 0.1 percent by mass of C, 10 to 20 percent by mass of Cr, 2.0 to 3.0 percent by mass of Al, 0 to 23 percent by mass of Co, 5 to 12 percent by mass of W and Mo in total, and 3 to 12 percent by mass of Mo, with the remainder being Ni and inevitable impurities.

6. A welded turbine rotor configured by integrating a nickel member comprising a first Ni-base alloy and a steel member comprising a ferritic steel through a second Ni-base alloy,
   wherein the second Ni-base alloy is interposed between the ferritic steel and the first Ni-based alloy,
   wherein the first Ni-base alloy has a γ' phase solid solution temperature of 900° C. or higher, and a creep fracture strength at 675° C. of 100 MPa or more,
   wherein the second Ni-base alloy is a γ' phase precipitation strengthening type Ni-base alloy consisting essentially of 0.001 to 0.1 percent by mass of C, 10 to 20 percent by mass of Cr, 2.0 to 3.0 percent by mass of Al, 5 to 12 percent by mass of W and Mo in total, 3 to 12 percent by mass of Mo, and the balance being Ni, and
   wherein the second Ni-base alloy has a γ' phase solid solution temperature of 850° C. or lower, and a γ' phase precipitate of 10% to 25% by volume, and the second Ni-base alloy contains essentially no Ti, Nb, and Ta.

7. The welded turbine rotor according to claim 6, wherein the second Ni-base alloy is joined by welding to the nickel member, and
   the second Ni-base alloy is joined by welding to the steel member.

8. The welded turbine rotor according to claim 6, wherein the nickel member and the steel member are welded to each other by using the second Ni-base alloy as a weld metal.

9. A steam turbine including the welded turbine rotor according to claim 6, and the steam turbine configured for operation in a main steam temperature of 675° C. or higher.

10. The welded turbine rotor according to claim 1, wherein a 0.2% proof stress of the second Ni-base alloy at 650° C. is 405 to 450 MPa.

11. The welded turbine rotor according to claim 6, wherein a 0.2% proof stress of the second Ni-base alloy at 650° C. is 405 to 450 MPa.

12. The welded turbine rotor according to claim 1, wherein a 0.2% proof stress of the second Ni-base alloy at 650° C. is 450 MPa.

13. The welded turbine rotor according to claim 6, wherein a 0.2% proof stress of the second Ni-base alloy at 650° C. is 450 MPa.

* * * * *